US010752228B2

(12) United States Patent
Peichl et al.

(10) Patent No.: US 10,752,228 B2
(45) Date of Patent: Aug. 25, 2020

(54) METHOD FOR OPERATING AN ELECTRO HYDRAULIC BRAKE SYSTEM, AND BRAKE SYSTEM

(71) Applicant: Continental Teves AG & Co. oHG, Frankfurt am Main (DE)

(72) Inventors: Thomas Peichl, Wöllstadt (DE); Holger Schmidt, Wettenberg (DE); Thorsten Ullrich, Gernsheim (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 16/335,779

(22) PCT Filed: Oct. 9, 2017

(86) PCT No.: PCT/EP2017/075632
§ 371 (c)(1),
(2) Date: Mar. 22, 2019

(87) PCT Pub. No.: WO2018/069223
PCT Pub. Date: Apr. 19, 2018

(65) Prior Publication Data
US 2019/0241167 A1 Aug. 8, 2019

(30) Foreign Application Priority Data

Oct. 11, 2016 (DE) .................. 10 2016 219 699
Sep. 13, 2017 (DE) .................. 10 2017 216 118

(51) Int. Cl.
*B60T 13/58* (2006.01)
*B60T 13/68* (2006.01)
(Continued)

(52) U.S. Cl.
CPC .......... *B60T 13/686* (2013.01); *B60T 8/4081* (2013.01); *B60T 13/161* (2013.01); *B60T 13/165* (2013.01);
(Continued)

(58) Field of Classification Search
CPC ...... B60T 7/042; B60T 8/4081; B60T 8/4086; B60T 13/62; B60T 13/662; B60T 13/686; B60T 13/745
(Continued)

(56) References Cited

U.S. PATENT DOCUMENTS 9,145,119 B2 * 9/2015 Biller ................... B60T 8/4081
9,205,821 B2 * 12/2015 Biller ................... B60T 8/4081
(Continued)

FOREIGN PATENT DOCUMENTS

DE 102012202645 A1 10/2012
DE 102012205860 A1 10/2012
(Continued)

OTHER PUBLICATIONS

English translation of the Written Opinion for International Application No. PCT/EP2017/075632, dated Feb. 6, 2018—6 pages.
(Continued)

*Primary Examiner* — Christopher P Schwartz
(74) *Attorney, Agent, or Firm* — RatnerPrestia

(57) ABSTRACT

A method for operating an electrohydraulic brake installation for a motor vehicle having at least first, second, third and fourth hydraulically actuatable wheel brakes, a first brake system including a master brake cylinder actuatable by a brake pedal and hydraulically connected by at least one electrically actuatable isolating valve to the four wheel brakes, and including a first electrically controllable pressure provision device hydraulically connected to the four wheel brakes via at least one electrically actuatable sequence
(Continued)

valve, and a second brake system including a second electrically controllable pressure provision device hydraulically connected to the first and the third wheel brake, and including in each case one isolating valve for the first and third wheel brake. The isolating valve is arranged in each case in a hydraulic connection between the first brake system and the corresponding wheel brake.

20 Claims, 3 Drawing Sheets

(51) Int. Cl.
  *B60T 8/40* (2006.01)
  *B60T 13/16* (2006.01)
  *B60T 13/66* (2006.01)
(52) U.S. Cl.
  CPC ....... *B60T 13/662* (2013.01); *B60T 2270/402* (2013.01); *B60T 2270/404* (2013.01)
(58) Field of Classification Search
  USPC .................. 303/3, 9.62, 15, 20, 114.1, 10
  See application file for complete search history.

(56) References Cited

U.S. PATENT DOCUMENTS

| | | | |
|---|---|---|---|
| 9,308,905 B2 | 4/2016 | Biller et al. | |
| 9,365,199 B2* | 6/2016 | Drumm | B60T 8/3655 |
| 9,637,102 B2 | 5/2017 | Drumm et al. | |
| 2014/0028084 A1* | 1/2014 | Biller | B60T 8/4081 303/9.62 |
| 2014/0152085 A1* | 6/2014 | Biller | B60T 8/4081 303/10 |
| 2017/0274884 A1 | 9/2017 | Besier et al. | |
| 2017/0282877 A1* | 10/2017 | Besier | B60T 8/4086 |
| 2019/0016321 A1* | 1/2019 | Dinkel | B60T 13/686 |

FOREIGN PATENT DOCUMENTS

| | | |
|---|---|---|
| DE | 102012205962 A1 | 11/2012 |
| DE | 102012210809 A1 | 1/2013 |
| DE | 102014225954 A1 | 6/2016 |
| DE | 102014225956 A1 | 6/2016 |
| DE | 102014225958 A1 | 6/2016 |
| EP | 2641798 A1 | 9/2013 |

OTHER PUBLICATIONS

International Search Report and Written Opinion for International Application No. PCT/EP2017/075632, dated Feb. 6, 2018—9 pages.

* cited by examiner

METHOD FOR OPERATING AN ELECTRO HYDRAULIC BRAKE SYSTEM, AND BRAKE SYSTEM

CROSS REFERENCE TO RELATED APPLICATIONS

This application is the U.S. National Phase Application of PCT International Application No. PCT/EP2017/075632, filed Oct. 9, 2017, which claims priority to German Patent Application No. 10 2016 219 699.5, filed Oct. 11, 2016, and German Patent Application No. 10 2017 216 118.3, filed Sep. 13, 2017 the contents of such applications being incorporated by reference herein.

FIELD OF THE INVENTION

The invention relates to a method for operating an electrohydraulic brake installation, and to a brake installation in which such a method is implemented.

BACKGROUND OF THE INVENTION

In motor vehicle engineering, "brake-by-wire" brake installations are being used ever more widely. Such brake installations comprise not only a master brake cylinder which is actuatable by the vehicle driver but also an electrically activatable pressure provision device, by means of which an actuation of the wheel brakes is performed in a "brake-by-wire" operating mode, in which the vehicle driver is decoupled from direct action on the wheel brakes.

Brake installations which are intended for use in vehicles which drive in automated fashion must, for a fault which occurs during automated driving (autopilot), provide an electrically controllable fall-back level in the brake installation, which ensures reliable braking of the vehicle until the human vehicle driver has taken over the task of driving again. In this regard, it is known from DE 10 2014 225 954 A1, incorporated herein by reference, to provide a brake installation having a primary brake system, which comprises a master brake cylinder actuatable by means of a brake pedal, a connectable and disconnectable simulation device for generating a brake pedal feel as required, a first electrically controllable pressure provision device for actuating the four wheel brakes, and an electrically controllable pressure modulation device for setting wheel-specific brake pressures for the four wheel brakes, and having a secondary brake system for the two front-wheel brakes, which secondary brake system is connected hydraulically in series between the primary brake system and the two front-wheel brakes. The secondary brake system comprises a second electrically controllable pressure provision device for actuating the front-wheel brakes and, for each front-wheel brake, at least one electrically actuatable isolating valve, which is arranged in the hydraulic connection between the first brake system and the corresponding front-wheel brake. In the event of a failure of the primary brake system, the secondary brake system constitutes the electrically activatable fall-back level for the braking of the vehicle during automated operation. Here, in DE 10 2014 225 954 A1, it is described that, in the normal operating mode of the brake installation, the four wheel brakes are supplied with brake pressure by means of the first pressure provision device of the primary brake system. In the event of a failure of the first pressure provision device or of the primary brake system, only the two front-wheel brakes are supplied with brake pressure by means of the second pressure provision device of the secondary brake system.

This constitutes the electrically controllable fall-back level for the braking of the vehicle during automated operation. DE 10 2014 225 954 A1 describes an operating concept for the brake installation in which either the primary brake system or the secondary brake system in each case exclusively (on its own) implements the braking demand of a virtual driver (autopilot). Here, "exclusively" means that, while one brake system performs the pressure provision, the other brake system is passive or "electrically deenergized", that is to say neither the pressure provision device nor any of the valves of the other brake system is actuated. Such an operating concept however has numerous disadvantages. For example, a superposed brake actuation by the human driver during the provision of pressure by the secondary brake system, that is to say a takeover by the driver, cannot be performed in a manner controlled by the system. Also, during the provision of pressure by the secondary brake system only to two of the four wheel brakes, the possible braking action is limited to approximately 60%.

SUMMARY OF THE INVENTION

An aspect of the invention is an improved method for operating a brake installation having a first brake system and a second brake system which is connected hydraulically in series between the first brake system and two of the at least four wheel brakes, and of providing a corresponding brake installation. In particular, it is sought to avoid the described disadvantages.

An aspect of the invention is based on the concept, in an electrohydraulic brake installation having at least one first, one second, one third and one fourth hydraulically actuatable wheel brake, a first brake system comprising a master brake cylinder which is actuatable by means of a brake pedal and which is hydraulically connected by means of at least one electrically actuatable isolating valve to the four wheel brakes, and comprising a first electrically controllable pressure provision device which is hydraulically connected to the four wheel brakes, and a second brake system comprising a second electrically controllable pressure provision device which is hydraulically connected to the first and the third wheel brake, and comprising in each case one isolating valve for the first and the third wheel brake, wherein the isolating valve is arranged in each case in a hydraulic connection between the first brake system and the corresponding wheel brake, in predefined states of the brake installation, of performing a brake pressure build-up in the second and the fourth wheel brake by virtue of the second pressure provision device being activated with the isolating valves open.

Initially, the first electrically controllable pressure provision device is hydraulically connected to the four wheel brakes in order to be able to build up a brake pressure in each of the four wheel brakes, and the second electrically controllable pressure provision device is hydraulically connected to the first and the third wheel brake in order to be able to build up a brake pressure in the first and the third wheel brakes.

An aspect of the invention offers the advantage that, in the event of an activation of the second pressure provision device, in addition to a brake pressure build-up in the first and the third wheel brake which, for this purpose, are hydraulically connected to the second pressure provision device, a brake pressure build-up also takes place in the second and the fourth wheel brake, because pressure medium passes from the second pressure provision device via the open isolating valves to the first brake system, which in turn is connected to the second and the fourth wheel brake. In the predefined states of the brake installation, it is thus the case that a brake pressure build-up is performed at all four wheel brakes by means of the second pressure provision device of the second brake system, and not only at the first and the third wheel brake, which are directly connected to the second pressure provision device.

The method is preferably a method for operating the brake installation during highly automated driving, when a braking demand is imparted by a virtual driver or an autopilot.

The first and the third wheel brake are hydraulically connected via the second brake system (or the respective isolating valve of the second brake system) to the first brake system (and thus to the master brake cylinder and the first pressure provision device), that is to say, for the first and the third wheel brake, the second brake system is arranged hydraulically between the first brake system and the first and the third wheel brake.

It is preferable if a first outlet pressure port of the first brake system (for the first wheel brake) is connected to a first inlet pressure port of the second brake system (for the first wheel brake), and a third outlet pressure port of the first brake system (for the third wheel brake) is connected to a second inlet pressure port of the second brake system (for the third wheel brake).

The second brake system preferably comprises a first hydraulic connecting line, which connects the first brake system (in particular the first outlet pressure port of the first brake system) to the first wheel brake, and a second hydraulic connecting line, which connects the first brake system (in particular the third outlet pressure port of the first brake system) to the third wheel brake, wherein, in each case, the corresponding isolating valve is arranged in the first and in the second connecting line.

The second and the fourth wheel brake are preferably connected directly to the first brake system. This means that the second and the fourth wheel brake is hydraulically connected in each case via a brake line to the first brake system, wherein no electrically activatable valve is arranged in the brake lines for the second and the fourth wheel brake after (or downstream of) the outlet pressure port of the first brake system. It is also the case that no pump or the like is arranged in the brake line. It is particularly preferably also the case that no check valve is arranged in the brake line.

It is preferable for a second outlet pressure port of the first brake system (for the second wheel brake) to be connected via a (second) brake line directly to the second wheel brake, and for a fourth outlet pressure port of the first brake system (for the fourth wheel brake) to be connected via a (fourth) brake line directly to the fourth wheel brake. These brake lines may run outside the hydraulics unit of the second brake system or else through the hydraulics unit of the second brake system. In both cases, the second pressure provision device is however not connected directly to the second and the fourth wheel brake or to the second or the fourth brake line.

The first and the third wheel brake are preferably assigned to the wheels of a front axle of the motor vehicle. Correspondingly, the second and the fourth wheel brake are assigned to the wheels of a rear axle of the motor vehicle.

The second pressure provision device is preferably hydraulically connected in each case directly to the first or to the third wheel brake, that is to say, in each case, no electrically actuatable valve that could constitute a flow resistance is arranged between the second pressure provision device and the wheel brake.

It is preferable for the second pressure provision device to be connected at the pressure side to the hydraulic connections between the first brake system and first or third wheel brake, respectively, in a region between the isolating valve and the wheel brake, that is to say downstream of the respective isolating valve.

The first brake system preferably comprises a (wheel-specific) outlet pressure port for each of the four wheel brakes. The second brake system preferably comprises a wheel-specific inlet pressure port and a wheel-specific outlet pressure port for the first and the third wheel brakes. Here, in each case, the inlet pressure port of the second brake system is connected to that outlet pressure port of the first brake system assigned to the wheel brake, and the outlet pressure port of the second brake system is connected to the wheel brake.

Preferably, for the brake pressure build-up in the second and fourth wheel brake, pressure medium is conveyed by the second pressure provision device via the isolating valves and the first brake system to the second and the fourth wheel brake.

The first electrically controllable pressure provision device is preferably hydraulically connected by means of at least one electrically actuatable sequence valve to the four wheel brakes.

In a preferred embodiment of an aspect of the invention, for the brake pressure build-up in the second and the fourth wheel brake by means of the second pressure provision device, at least one of the valves of the first brake system is actuated. Since electrically actuatable components of the first and of the second brake system are actuated, this operating method is also referred to as a cooperative operating concept of first and second brake system. The cooperative operating concept permits an improved overall braking action, prevents or reduces yaw disturbances of the vehicle during the braking operation, and permits the control of the brake installation in the event of a superposed brake actuation by the human driver.

Preferably, during the brake pressure build-up in the second and the fourth wheel brake by means of the second pressure provision device, the at least one isolating valve of the first brake system is closed. The isolating valve is also closed in the absence of a brake pedal actuation by the driver and in the presence of a braking demand of the virtual driver (autopilot). The master brake cylinder is thus isolated from the wheel brakes. The second or fourth wheel brake is, via the first brake system, likewise coupled to the second pressure provision device, and, in the steady-state situation, attains the same brake pressure as the first or third wheel brake respectively.

If the first brake system comprises a simulation device which is hydraulically connected to the master brake cylinder, wherein the simulation device is assigned an electrically actuatable simulator valve by means of which the simulation device is connectable and disconnectable, then, in the event of an actuation of the brake pedal by the driver, the simulation device is connected by means of the simulator valve during the brake pressure build-up by means of the second pressure provision device. It is thus possible for pressure medium to flow from the master brake cylinder into the simulation device.

It is preferable if the actuation of the brake pedal is detected by means of a sensor of the first brake system and the signal of the sensor is taken into consideration in the activation of the second pressure provision device.

One of the predefined states of the brake installation for the brake pressure build-up in the second and the fourth wheel brake by means of the second pressure provision device is preferably present if a pressure build-up is not possible by means of the first pressure provision device. Then, the braking demand by a virtual driver or an autopilot is implemented by means of the second pressure provision device.

One of the predefined states of the brake installation is preferably present (that is to say the brake pressure build-up in the second and the fourth wheel brake is implemented by means of the second pressure provision device) if, in addition, the electrical actuation of the at least one isolating valve of the first brake system is possible, that is to say if the actuation of the isolating valve or of the isolating valves of the first brake system is functional. Otherwise, the master brake cylinder cannot be isolated from the wheel brakes.

One of the predefined states of the brake installation is preferably present if, in addition, the electrical actuation of an electrically actuatable simulator valve provided for the connection or disconnection of a simulation device is possible, that is to say if the actuation of the simulator valve of the first brake system is functional. Otherwise, the simulation device cannot be connected, and no pressure medium can be displaced by the master brake cylinder into the simulation device.

One of the predefined states of the brake installation is preferably present if, in addition, a detection of an actuation of the brake pedal by means of a sensor of the first brake system is possible.

One of the predefined states of the brake installation is preferably present if only an insufficient or unquantifiable pressure build-up by means of the first pressure provision device is possible. This is the case for example if pressure sensing of the first pressure provision device (for example by means of a pressure sensor assigned to the first pressure provision device) is not possible or is defective.

One of the predefined states of the brake installation is present (that is to say the brake pressure build-up in the second and the fourth wheel brake is implemented by means of the second pressure provision device) if, in a first pressure medium reservoir which is assigned to the first brake system and which is in particular at atmospheric pressure, a pressure medium level is present which is lower than a predefined pressure medium threshold value.

The brake pressure build-up is then implemented by means of the second pressure provision device with pressure medium from the one or more second pressure medium reservoirs assigned to the second brake system.

The first brake system is also referred to as primary brake system, and the second brake system is also referred to as secondary brake system.

The first and second brake systems are preferably formed as separate modules (units) or as separate electrohydraulic open-loop and closed-loop control units, which each comprise a hydraulics unit (or hydraulic open-loop and closed-loop control unit) and an electronics unit (or electronic open-loop and closed-loop control unit). It is however also possible for the first and the second brake system, in particular the hydraulic components thereof, to be arranged in one unit or one module (for example in one housing or in one hydraulics unit/hydraulic open-loop and closed-loop control unit). Then, too, it is advantageous if each of the brake systems is assigned a separate electronics unit or electronic open-loop and closed-loop control unit for the activation of the corresponding pressure provision device and valves of the respective brake system.

The first brake system preferably comprises a simulation device which is hydraulically connected to the master brake cylinder, wherein the simulation device is assigned an electrically actuatable simulator valve by means of which the simulation device is connectable and disconnectable. The simulation device is intended to provide the driver with a known brake pedal feel in the event of an isolation of the master brake cylinder from the wheel brakes, for example in a "brake-by-wire" operating mode.

The first brake system preferably comprises at least one electrically actuatable inlet valve for setting wheel-specific brake pressures for each of the four wheel brakes. The inlet valve is arranged in each case between the first pressure provision device and the wheel brake.

The inlet valve assigned to the second wheel brake is particularly preferably connected directly to the second wheel brake, and the inlet valve assigned to the fourth wheel brake is particularly preferably connected directly to the fourth wheel brake. The inlet valve assigned to the first wheel brake is connected, in particular directly, to the isolating valve, assigned to the first wheel brake, of the second brake system, and the inlet valve assigned to the third wheel brake is connected, in particular directly, to the isolating valve assigned to the third wheel brake. The isolating valve of the second brake system is thus arranged in each case in a hydraulic connection between the inlet valve of the first brake system and the corresponding wheel brake.

It is preferable if, in the predefined states of the brake installation or during the cooperative operating concept, brake pressure control, in particular slip control, is implemented, wherein a limitation of a wheel brake pressure at the second or the fourth wheel brake is realized by means of a closure of the inlet valve, assigned to the corresponding wheel brake, of the first brake system.

Preferably, the inlet valve of the first wheel brake and the inlet valve of the second wheel brake are connected to one another at an inlet side (that is to say at their ports averted from the wheel brakes) via a first brake circuit supply line. Preferably, the inlet valve of the third wheel brake and the inlet valve of the fourth wheel brake are connected to one another at an inlet side (that is to say at their ports averted from the wheel brakes) via a second brake circuit supply line. The first brake circuit supply line is connected via a first isolating valve to the master brake cylinder and via a first sequence valve to the first pressure provision device. The second brake circuit supply line is connected via a second isolating valve to the master brake cylinder and via a second sequence valve to the first pressure provision device. It is particularly preferable if the isolating valves are designed to be open when electrically deenergized and the sequence valves are designed to be closed when electrically deenergized.

The second brake system preferably comprises at least one second pressure medium reservoir, which is in particular at atmospheric pressure and from which the second pressure provision device can draw pressure medium. The second pressure medium reservoir is particularly preferably integrated into the hydraulics unit of the second brake system. In this way, it is possible to avoid insufficient pressure medium being available when required owing to a leaking or destroyed hydraulic line to a pressure medium reservoir assigned to the first brake system.

The second brake system preferably comprises at least one dissipation valve which is closed when electrically deenergized, wherein the second pressure provision device is connected at the pressure side via the at least one dissipation valve to the second pressure medium reservoir.

A brake pressure dissipation in the second or the fourth wheel brake during the cooperative operating concept is performed preferably by opening the at least one dissipation valve.

Preferably, the second pressure provision device is connected at a suction side via at least one intake valve, which is closed when electrically deenergized, to the at least one second pressure medium reservoir.

For the brake pressure build-up in the second and the fourth wheel brake by means of the second pressure provision device during the cooperative operating concept, the at least one intake valve is preferably opened.

The second pressure provision device is preferably of two-circuit design, with a first circuit for the first wheel brake and a second circuit for the third wheel brake.

The second pressure provision device advantageously comprises two pumps, which are driven jointly by one electric motor.

The second brake system preferably comprises two second pressure medium reservoirs, which are at atmospheric pressure. It is particularly preferable if the suction side of the first pump is hydraulically connected via a first suction line to one second pressure medium reservoir and the suction side of the second pump is hydraulically connected via a second suction line to the other second pressure medium reservoir. It is preferable if in each case one second pressure medium reservoir provides the brake fluid for exactly one of the wheel brakes (first or third wheel brake).

It is advantageous if an intake valve which is closed when electrically deenergized is connected into each of the suction lines.

It is advantageous if the first pump is connected at the pressure side to the hydraulic connection between the first brake system and the third wheel brake in a region between the isolating valve and the third wheel brake, that is to say downstream of the respective isolating valve. It is advantageous if the second pump is connected at the pressure side to the hydraulic connection between the first brake system and the first wheel brake in a region between the isolating valve and the first wheel brake, that is to say downstream of the respective isolating valve.

A first hydraulic return line branches off from the hydraulic connection between the first brake system and the first wheel brake in a region between the isolating valve and the first wheel brake, which first hydraulic return line is hydraulically connected to the associated second pressure medium reservoir. Correspondingly, a second hydraulic return line branches off from the hydraulic connection between the first brake system and the third wheel brake in a region between the corresponding isolating valve and the third wheel brake, which second hydraulic return line is hydraulically connected to the other second pressure medium reservoir. In this way, pressure medium can be discharged from the corresponding wheel brake in a targeted manner. This permits the setting of different brake pressures in the first and the third, wheel brake, which are hydraulically connected directly to the second brake system.

A dissipation valve which is closed when electrically deenergized is advantageously connected into the respective return line. The dissipation valve is preferably switched into its isolating position during a pressure build-up and, when required, switched into its pass-through position in order to dissipate pressure in the respective wheel brake.

The second pressure medium reservoirs are preferably connected to one another by means of a hydraulic equalization line, which is connected to the first pressure medium reservoir.

The second brake system preferably comprises a first pressure sensor, which measures the pressure in the first wheel brake, and a second pressure sensor, which measures the pressure in the third wheel brake, such that pressure control can also be implemented in the second brake system.

An aspect of the invention also relates to a brake installation in which a method according to an aspect of the invention is implemented.

The first brake system preferably comprises a master brake cylinder which is actuatable by means of a brake pedal and which has a first and a second pressure chamber, wherein the first pressure chamber is hydraulically connected via an electrically actuatable first isolating valve to the third and the fourth wheel brake, and the second pressure chamber is hydraulically connected via an electrically actuatable second isolating valve to the first and the second wheel brake, and a first electrically controllable pressure provision device, which is hydraulically connected via an electrically actuatable first sequence valve to the third and the fourth wheel brake and which is hydraulically connected via an electrically actuatable second sequence valve to the first and the second wheel brake.

The second brake system preferably comprises, as second electrically controllable pressure provision device, a first and a second pump which are driven jointly by one electric motor, wherein the first pump is hydraulically connected at the pressure side to the third wheel brake and the second pump is hydraulically connected at the pressure side to the first wheel brake. It is advantageous if the respective pump is connected at the pressure side to the hydraulic connection between the first brake system and the (corresponding) wheel brake in a region between the isolating valve and the wheel brake, that is to say downstream of the isolating valve.

It is particularly preferable if the second pressure provision device or the respective pump is hydraulically connected at the pressure side directly to the first or third wheel brake, that is to say in particular without the interposition of an electrically actuatable valve.

BRIEF DESCRIPTION OF THE DRAWINGS

Further preferred embodiments of aspects of the invention will emerge from the claims and the following description with reference to figures.

In the figures, in each case highly schematically.

DETAILED DESCRIPTION OF THE PREFERRED EMBODIMENTS

In all of the figures, identical parts are denoted by the same reference designations.

Figure 1:
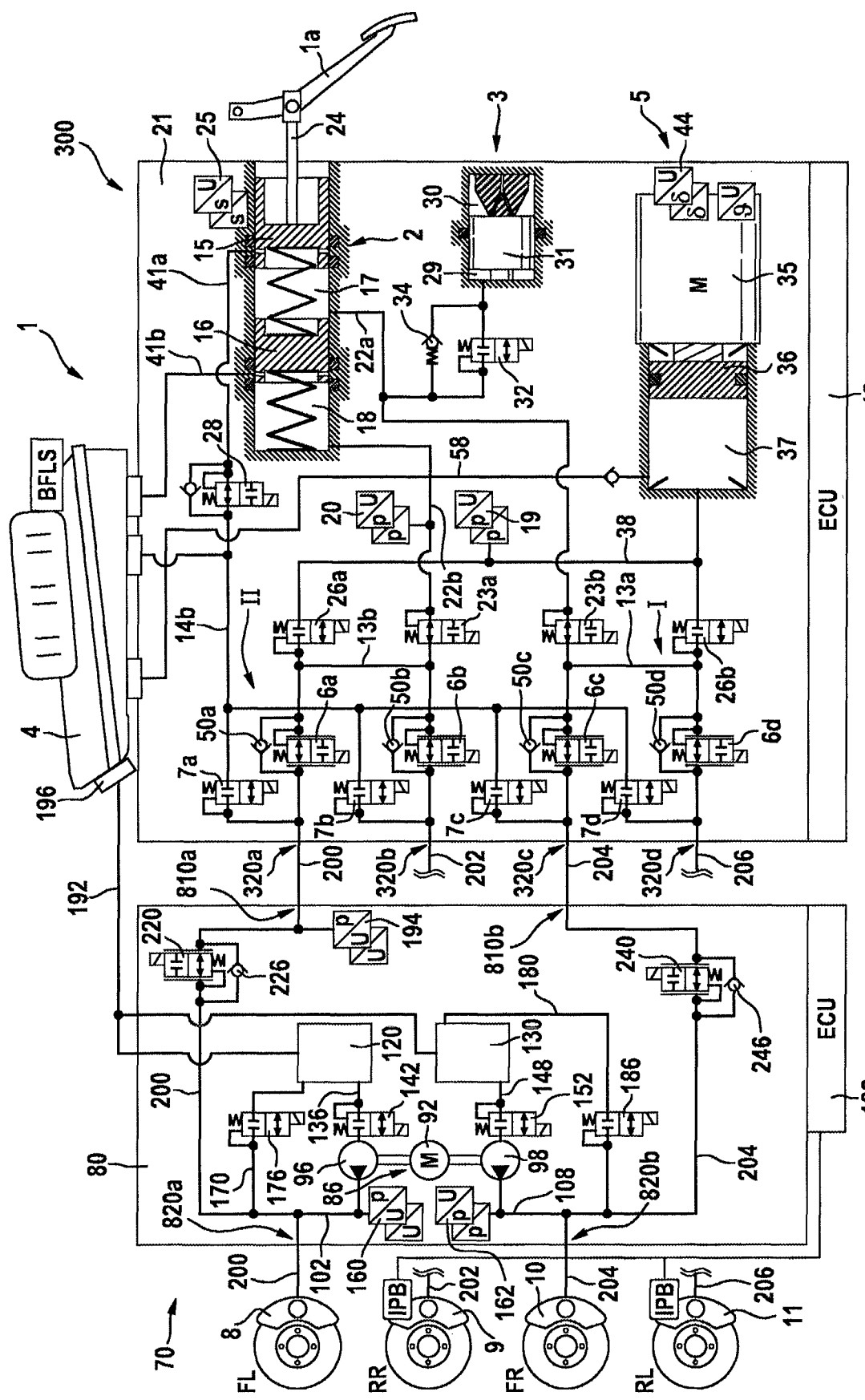
FIG. 1 shows a hydraulic circuit diagram of an exemplary brake installation for implementing a method according to an aspect of the invention.

FIG. 1 illustrates an exemplary brake installation 1 for implementing a method according to an aspect of the invention. The brake installation comprises a first brake system (primary brake system) 300, a second brake system (secondary brake system) 70 and four hydraulically actuatable wheel brakes 8-11. An expansion to more than four wheel brakes is easily possible.

In an example, the first brake system 300 and the second brake system 70 are each formed as a separate module (electrohydraulic open-loop and closed-loop control unit HECU). It is however also possible for the primary brake system 300 and secondary brake system 70 to be arranged in one unit/one module (for example in one housing). In the example, the electrohydraulic open-loop and closed-loop control unit of the first brake system comprises a hydraulics unit (or hydraulic open-loop and closed-loop control unit) 21 and an electronics unit (or electronic open-loop and closed-loop control unit) 12, and the electrohydraulic open-loop and closed-loop control unit of the second brake system comprises a hydraulics unit (or hydraulic open-loop and closed-loop control unit) 80 and an electronics unit (or electronic open-loop and closed-loop control unit) 182.

The first brake system 300 comprises a master brake cylinder 2 which is actuatable by means of a brake pedal 1a, a simulation device 3 which interacts with the master brake cylinder 2, a first pressure medium reservoir 4 which is assigned to the master brake cylinder 2 and which is at atmospheric pressure, a first electrically controllable pressure provision device 5, an electrically controllable pressure modulation device for setting wheel-specific brake pressures, and an electronic open-loop and closed-loop control unit (ECU) 12.

The first brake system 300 comprises a wheel-specific outlet pressure port 320a-320d for each of the wheel brakes 8-11.

The second outlet pressure port 320b of the first brake system 300 is connected directly to the second wheel brake 9 via a brake line 202, and the fourth outlet pressure port 320d of the first brake system 300 is connected directly to the fourth wheel brake 11 via a brake line 206. The brake lines 202, 206 may, as illustrated in FIG. 1, run outside the hydraulics unit 80 of the second brake system 70 or else through the hydraulics unit 80.

The first outlet pressure port 320a of the first brake system 300 is connected via a brake line 200 to the first wheel brake 8, and the third outlet pressure port 320c of the first brake system 300 is connected via a brake line 204 to the third wheel brake 10, wherein the brake lines 200, 204 are at least partially/piecewise a part of the second brake system 70, or in the example run partially/piecewise in the hydraulics unit 80.

The second brake system 70 thus comprises a first hydraulic connection or connecting line (brake line 200 or at least a part of the brake line 200) which connects the first brake system 300 (in particular the first outlet pressure port 320a of the first brake system) to the first wheel brake 8, and a second hydraulic connection or connecting line (brake line 204 or at least a part of the brake line 204), which connects the first brake system 300 (in particular the third outlet pressure port 320c of the first brake system) to the third wheel brake 10.

In other words, for the wheel brakes 8 and 10, the second brake system 70 is connected hydraulically downstream of the first brake system 300, and, for the wheel brakes 8 and 10, the second brake system 70 is connected hydraulically in series between the first brake system and the wheel brakes 8 and 10.

Correspondingly, the second brake system 70 has a first inlet pressure port 810a, which is connected to the first outlet pressure port 320a of the first brake system, and a first outlet pressure port 820a, which is assigned to the first inlet pressure port 810a and which is connected to the first wheel brake 8, and a second inlet pressure port 810b, which is connected to the third outlet pressure port 320c of the first brake system, and a second outlet pressure port 820b, which is assigned to the second inlet pressure port 810b and which is connected to the third wheel brake 10.

The second brake system 70 comprises a second electrically controllable pressure provision device 86, which is hydraulically connected to the wheel brakes 8 and 10 or to the brake lines 200 and 204, and an isolating valve 220, 240 for each of the wheel brakes 8, 10, which isolating valve is arranged in the hydraulic connection 200, 204 between the first brake system 300 and the corresponding wheel brake 8, 10. Furthermore, the second brake system 70 comprises further electrically actuatable valves 176, 186 and 142, 152, inter alia for setting wheel-specific brake pressures at the wheel brakes 8, 10, at least one (second) pressure medium reservoir 120, 130, which is at atmospheric pressure, and an electronic open-loop and closed-loop control unit (ECU) 182.

Connected in parallel with respect to the isolating valve 220 is a check valve 226 which, when the isolating valve 220 is shut off, prevents the backflow of pressure medium out of the first wheel brake 8. Correspondingly, connected in parallel with respect to the isolating valve 240 is a check valve 246 which, when the isolating valve 240 is shut off, prevents the backflow of pressure medium out of the third wheel brake 10.

A pressure sensor 194 measures the pressure in the brake line 200.

The wheel brakes 8 and 10 connected to the second brake system 70 are advantageously assigned to the front wheels FL and FR of the vehicle (FL: left-hand front wheel, FR: right-hand front wheel). The wheel brakes 9 and 11 connected to the first brake system 300 are assigned to the rear wheels RR and RL of the vehicle (RL: left-hand rear wheel, RR: right-hand rear wheel). This corresponds to a diagonal brake circuit distribution in the first brake system 300.

In the example, the pressure modulation device of the first brake system comprises one electrically actuatable inlet valve 6a-6d and one electrically actuatable outlet valve 7a-7d for each wheel brake 8-11, which inlet valve and outlet valve are hydraulically interconnected pairwise by way of central ports and, for each wheel brake 8-11, are connected to the corresponding outlet pressure port 320a-320d of the wheel brake. The inlet ports of the inlet valves 6a, 6b or 6c, 6d are connected in each case by means of a brake circuit supply line 13a or 13b respectively. A check valve 50a-50d which opens in the direction of the brake circuit supply lines 13a, 13b is connected in parallel with each of the inlet valves 6a-6d. The outlet ports of the outlet valves 7a-7d are connected to the pressure medium reservoir 4 via a return line 14b.

The brake circuit supply lines 13a, 13b are connected both to the master brake cylinder 2 and to the first pressure provision device 5.

Here, the brakes 8, 9 are hydraulically assigned to a second brake circuit II, and the brakes 10, 11 are hydraulically assigned to a first brake circuit I.

The master brake cylinder 2 of the first brake system has, in a housing or a hydraulics unit 21, two pistons 15, 16 which are arranged in series and which delimit the hydraulic pressure chambers 17, 18. The pressure chambers 17, 18 are connected to the first pressure medium reservoir 4 via radial bores formed in the pistons 15, 16 and corresponding pressure equalization lines 41a, 41b, wherein the connections can be shut off by a relative movement of the pistons 15, 16 in the hydraulics unit 21. A diagnostics valve 28 which is open when electrically deenergized is arranged, with a check valve connected in parallel, in the pressure equalization line 41a. Each of the pressure chambers 17, 18 is hydraulically connected via a hydraulic line 22a, 22b and an electrically actuatable isolating valve 23a, 23b, which is preferably open when electrically deenergized, to the corresponding brake circuit supply line 13a, 13b. The pressure chamber 18 is assigned the second brake circuit II, and the pressure chamber 17 is assigned the first brake circuit I.

By means of the isolating valves 23a, 23b, the hydraulic connection between the pressure chambers 17, 18 of the master brake cylinder 2 and the brake circuit supply lines 13a, 13b can be shut off. A pressure sensor 20 connected to the line section 22b detects the pressure built up in the pressure chamber 18 as a result of a displacement of the second piston 16.

A piston rod 24 couples the pivoting movement of the brake pedal 1a resulting from a pedal actuation to the translational movement of the first master brake cylinder piston 15, the actuation travel of which is detected by a travel sensor 25, which is preferably of redundant design. In this way, the corresponding piston travel signal is a measure of the brake pedal actuation angle. It represents a braking demand of the vehicle driver.

The simulation device (the simulator) 3 of the first brake system 300 is hydraulically couplable to the master brake cylinder 2 and, in the example, is composed substantially of a simulator chamber 29, a simulator spring chamber 30 and a simulator piston 31 which separates the two chambers 29, 30 from one another. The simulator piston 31 is supported on the hydraulics unit 21 by an elastic element (for example a spring), which is arranged in the simulator spring chamber 30 and which is advantageously preloaded. The simulator chamber 29 is connectable to the first pressure chamber 17 of the master brake cylinder 2 by means of an electrically actuatable simulator valve 32. When a pedal force is input and simulator valve 32 is open, pressure medium flows from the master brake cylinder pressure chamber 17 into the simulator chamber 29. A check valve 34 arranged hydraulically antiparallel with respect to the simulator valve 32 allows the pressure medium to flow back from the simulator chamber 29 to the master brake cylinder pressure chamber 17 largely unhindered, irrespective of the switching state of the simulator valve 32. Other embodiments and connections of the simulation device to the master brake cylinder 2 are conceivable.

The (first) electrically controllable pressure provision device 5 is designed as a hydraulic cylinder-piston assembly or a single-circuit electrohydraulic actuator, the pressure piston 36 of which, which delimits a pressure chamber 37, can be actuated by a schematically indicated electric motor 35 via a likewise schematically illustrated rotation/translational mechanism. A merely schematically indicated rotor position sensor which serves to detect the rotor position of the electric motor 35 is denoted by reference designation 44. Use may additionally also be made of a temperature sensor for sensing the temperature of the motor winding.

The pressure provision device 5 is connected via a system pressure line 38 to two electrically actuatable sequence valves 26a, 26b, which are preferably designed to be closed when electrically deenergized, wherein the sequence valve 26a is connected to the brake circuit supply line 13a and the sequence valve 26b is connected to the brake circuit supply line 13b. The first pressure provision device is thus connected separably (by means of the sequence valve) to the four wheel brakes 8-11.

An actuator pressure generated by a force action of the piston 36 on the pressure medium enclosed in the pressure chamber 37 is fed into the system pressure line 38 and detected by means of a pressure sensor 19, which is preferably of redundant design. When the sequence valves 26a, 26b are open, the pressure medium passes into the four wheel brakes 8-11 for the actuation thereof, wherein the pressure medium for the wheel brakes 9 and 11 passes into the wheel brake directly, and the pressure medium for the wheel brakes 8 and 10 passes into the wheel brake via the second brake system 70.

Additional pressure medium can be drawn into the pressure chamber 37, through a replenishment line 58 with a check valve, by means of a retraction of the piston 36 while the sequence valves 26a, 26b are closed.

In the example, the second pressure provision device 86 comprises an electric motor 92 by means of which, if required, two pumps 96, 98 are operated. The pump 96 is hydraulically connected at the pressure side via a hydraulic line 102 to the brake line 200 and thus to the first wheel brake 8. The pump 98 is connected at the pressure side via a line 108 to the brake line 204 and thus to the third wheel brake 10.

A pressure sensor 160 which is preferably of redundant design measures the pressure in the line 102. A pressure sensor 162 of preferably redundant design measures the pressure in the line 108. The open-loop and closed-loop control unit 182 is connected at the signal input side to the pressure sensors 160, 162.

In order that the second brake system 70 can reliably perform a brake pressure build-up when required, in the example, two second pressure medium reservoirs 120, 130 for pressure medium are provided, which are integrated in the hydraulics unit 80. The pressure medium reservoir 120 is hydraulically connected to the suction side of the pump 96 via a hydraulic line 136, into which there is connected an electrically actuatable intake valve 142 which is preferably closed when electrically deenergized. The pressure medium reservoir 130 is hydraulically connected at the suction side to the pump 98 via a hydraulic line 148, into which there is connected an electrically actuatable intake valve 152 which is preferably closed when electrically deenergized.

A hydraulic return line 170 branches off from the brake line 200 of the first wheel brake 8 downstream of the isolating valve 220, which hydraulic return line hydraulically connects the brake line 200 to the second pressure medium reservoir 120, wherein an electrically actuatable dissipation valve 176, which is preferably closed when electrically deenergized, is connected into the return line 170. A hydraulic return line 180 branches off from the brake line 204 of the third wheel brake 10 downstream of the isolating valve 240, which hydraulic return line hydraulically connects the brake line 204 to the second pressure medium reservoir 130, wherein a dissipation valve 186, which is closed when electrically deenergized, is connected into the return line 180.

A common hydraulic equalization line 192 connects the second pressure medium reservoirs 120, 130 to the first pressure medium reservoir 4.

Figure 2:
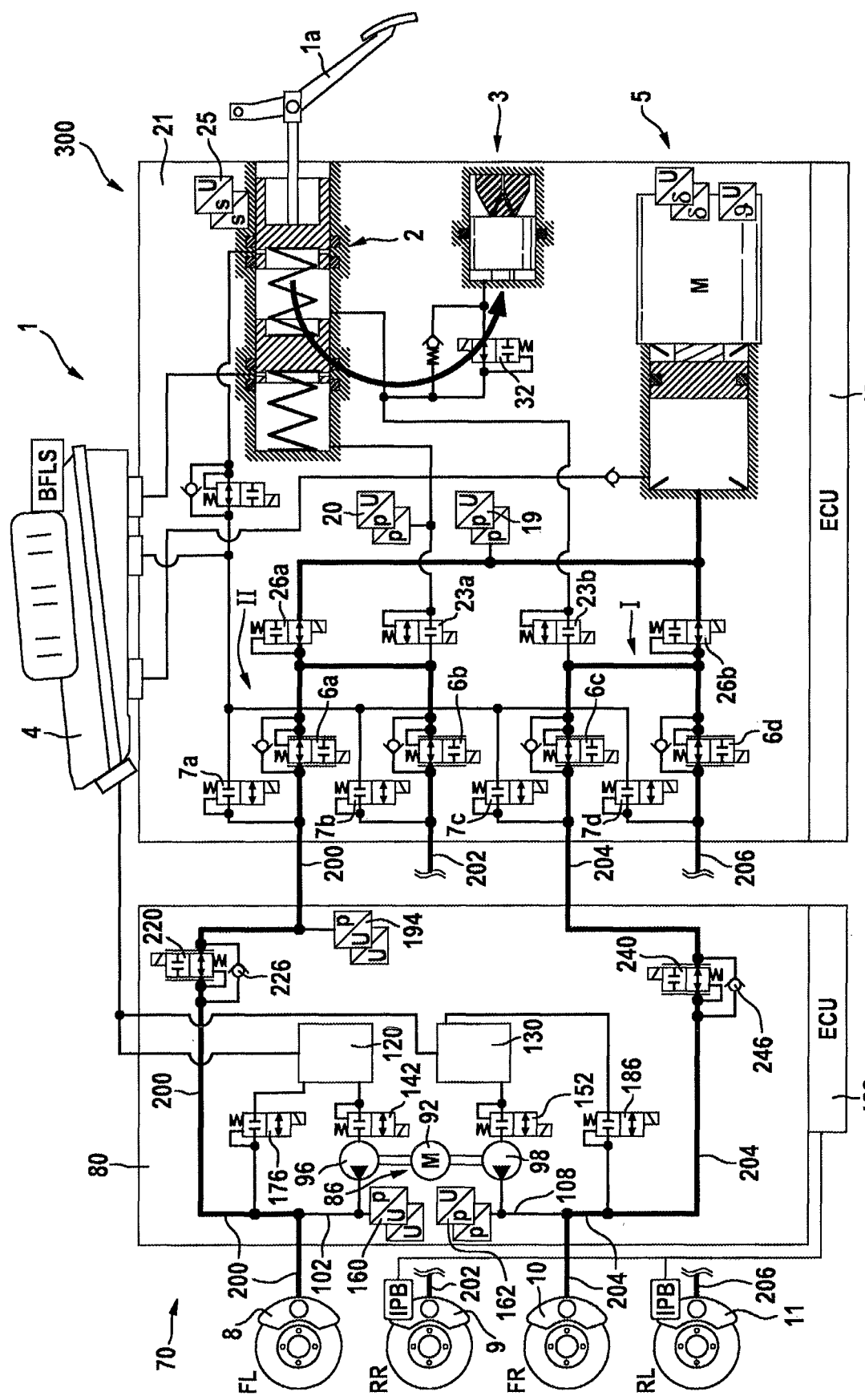
FIG. 2 shows the exemplary brake installation of FIG. 1 in a first operating state.

FIG. 2 shows the exemplary brake installation 1 of FIG. 1 in an operating state with an intact first brake system 300 (first operating method). Here, the pressure provision for the four wheel brakes 8-11 is performed by means of the first pressure provision device 5 of the first brake system 300. Any pressure modulations (for example slip control) are implemented by means of the pressure modulation device, that is to say the inlet and outlet valves 6a-6d, 7a-7d of the first brake system 300. The pressure provision by the pressure provision device 5 takes place via the opened sequence valves 26a, 26b into the wheel brakes 8-11, as indicated in FIG. 2 by the emboldened lines.

The second brake system is passive (for example electrically deenergized), and in particular, the isolating valves 220, 240 are open.

A superposed actuation of the brake pedal 1a by the human driver is performed in the so-called by-wire operating mode, that is to say the isolating valves 23a, 23b of the first brake system 300 are closed, and pressure medium is displaced out of the master brake cylinder 2 via the opened simulator valve 32 into the simulation device 3 (indicated by an arrow in FIG. 2). From the signals of the piston rod travel imparted in the process and the master brake cylinder pressure (pressure sensor 20), a driver braking demand signal is derived and is provided to the virtual driver (autopilot) for arbitration (prioritization).

If the first brake system 300 has a malfunction or fails (entirely), the exemplary brake installation 1 of FIG. 1 is operated in a second operating method. Here, the first brake system is passive (electrically deenergized), and a braking demand of the virtual driver (autopilot) is implemented exclusively by means of the second brake system 70 (so-called exclusive operating concept) by virtue of brake pressure being built up only at the front-wheel brakes 8, 10. For this purpose, the two isolating valves 220, 240 are switched into their isolating position, such that the wheel brakes 8, 10 are hydraulically isolated from the first brake system 300 (and thus from the first pressure provision device 5 and from the master brake cylinder 2). The electronic open-loop and closed-loop control unit 182 activates the electric motor 92, which drives the pumps 96, 98. The respective pump 96, 98 draws pressure medium in from the respective pressure medium reservoir 120, 130 with intake valves 142, 152 open, and conveys said pressure medium via the lines 102, 108 and the brake lines 200, 204 into the wheel brake 8, 10. During the pressure build-up, the dissipation valves 176, 186 are closed. A pressure dissipation in one of the wheel brakes 8, 10 can be implemented as required by means of the associated dissipation valve 176, 186 by virtue of pressure medium being discharged into the respective pressure medium reservoir 120, 130.

Thus, here, only the front-wheel brakes 8, 10 are available to the second brake system 70. Thus, the maximum attainable deceleration is limited to approximately 60% (depending on the axle load distribution of the vehicle).

The failure of the first brake system 300 may in this case be caused by an electrical fault of a system component or else as a result of hydraulic faults (leaks) of the overall brake installation, if these hydraulic faults lead to a critical low pressure medium level in the first pressure medium reservoir 4.

If a leak is present in one of the two front-wheel brake circuits and if the transition to the electrically controllable fall-back level (that is to say into the second operating method) occurs owing to the critical low pressure medium level, then subsequently only one of the front-wheel brakes will be effective for the braking of the vehicle.

A superposed actuation of the brake pedal 1a by the human driver during the provision of pressure by the second brake system 70, that is to say a takeover by the driver, cannot be performed in a manner controlled by the system during the second operating method. Since, in the case of the passive first brake system 300, the simulation device 3 is disconnected owing to the simulator valve 32 which is closed when electrically deenergized, a volume displacement/pressure medium displacement from the master brake cylinder 2 (via the isolating and inlet valves 23a, 23b, 6a-6d, which are open when electrically deenergized) directly into the (directly connected) rear-wheel brakes 9, 11 occurs as a result of the brake pedal actuation. This may possibly lead to overbraking thereof. Furthermore, a pressure increase also occurs in the front-wheel brakes 8, 10 if the master brake cylinder pressure imparted by the human driver exceeds the pressure demanded by the virtual driver and set by the second brake system 70 in the front-wheel brakes 8, 10. This is owing to the presence of the check valves 226, 246 at the isolating valves 220, 240 of the second brake system 70.

Figure 3:
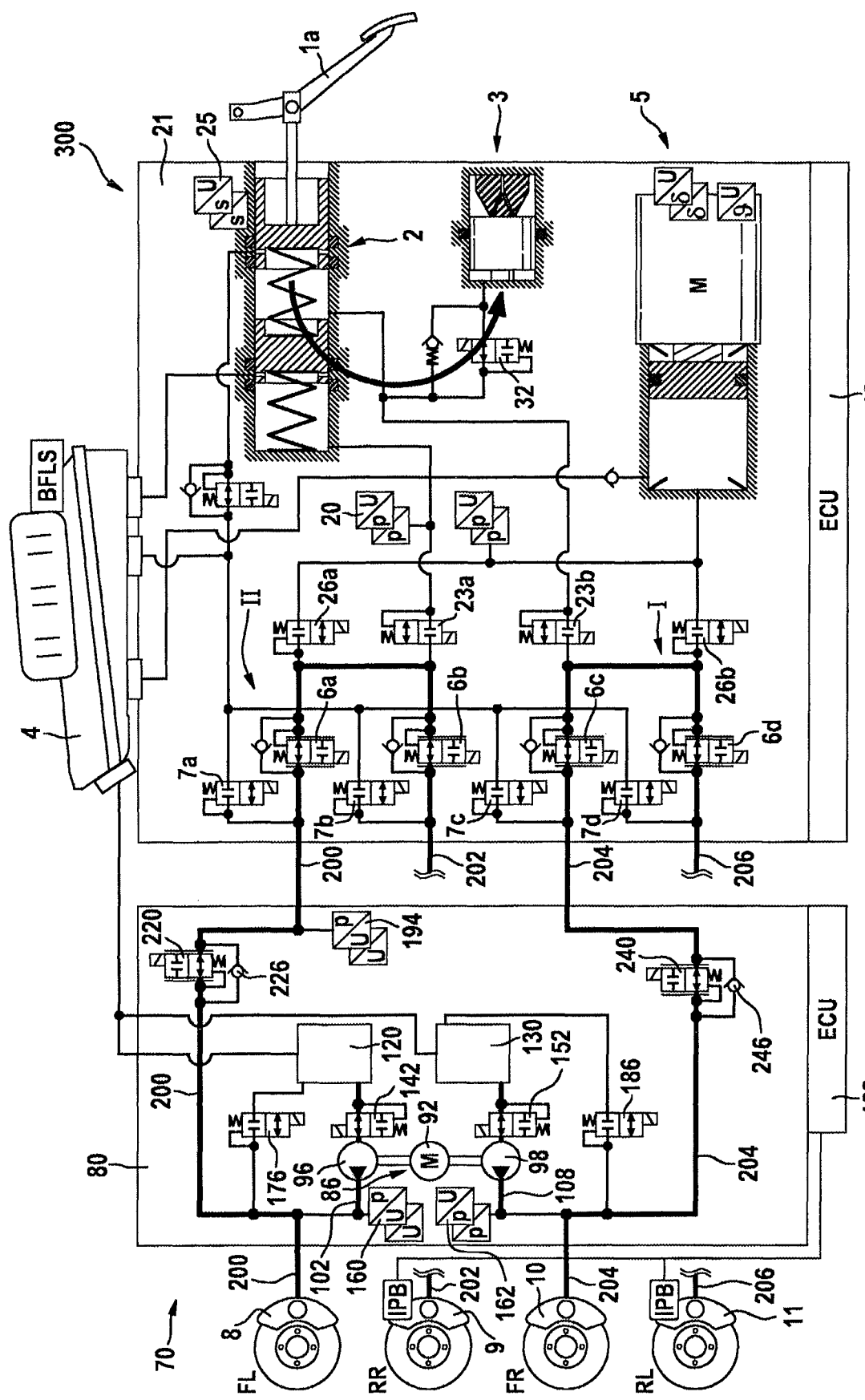
FIG. 3 shows the exemplary brake installation of FIG. 1 in a third operating state during the implementation of a method according to an aspect of the invention.

FIG. 3 shows the brake installation according to the example of FIG. 1 in a third operating state during an implementation of a method according to an aspect of the invention (so-called cooperative operating concept of the first and the second brake system).

In predefined states of the brake installation 1, a cooperative operating concept of the first brake system 300 and the secondary brake system 70 is implemented. Here, a brake pressure build-up is performed in the second and the fourth wheel brake 9, 11 by virtue of the second pressure provision device 86 being activated with the isolating valves 220, 240 for the first and third wheel brakes 8, 10 open. This leads to a brake pressure build-up at all four wheel brakes 8-11 by means of the second pressure provision device 86 of the second brake system 70 (not only at the wheel brakes 8, 10 connected to the second brake system 70).

The pressure provided by the second pressure provision device 86 passes firstly to the wheel brakes 8, 10 connected directly to the second brake system 70 and secondly via the open isolating valves 220, 240 to the first brake system 300, and from there to the other wheel brakes 9, 11 (which are not directly connected to the second brake system 70). This is illustrated in FIG. 3 by emboldened lines.

In the example, the implementation of the braking demand of the virtual driver by means of the second brake system 70 in cooperative operation is realized by means of pressure build-up by the second pressure provision device 86 (for example a 2-piston pump) with open isolating valves 220, 240 and opened intake valves 142, 152 of the second brake system 70, whereby the suction sides of the pumps 96, 98 are connected to the internal pressure medium reservoirs 120, 130.

In the example, in the first brake system 300, the master brake cylinder 2 is isolated by closing the isolating valves 23a, 23b. In this way, for each brake circuit I, II, the respectively assigned (diagonally opposite) rear-wheel brake 9, 11 is likewise coupled (indirectly via the first brake system 300) to the second pressure provision device 86 of the second brake system 70, that is to say, in the steady-state situation, attains the same brake pressure as the diagonal front-wheel brake 8, 10.

Furthermore, in the example, a connection of the simulation device 3 is performed in the first brake system 300 by opening the simulator valve 32.

A pressure dissipation is performed by means of the dissipation valves 176, 186, again back into the internal pressure medium reservoirs 120, 130 of the second brake system 70.

A circuit isolation (brake circuit I, II) is ensured here at all times, such that this operation can be implemented even in the case of non-localized leaks. If, owing to such a leak, one of the two internal pressure medium reservoirs 120, 130 of the second brake system 70 is exhausted, the capability to build up pressure in two diagonal wheel brakes is maintained, resulting in a considerably increased residual braking action and a reduced yaw disturbance.

A superposed brake actuation by the human driver at the brake pedal 1a is, in the example, performed as in the by-wire operating mode, that is to say the simulator valve 32 is opened (the sequence valves 26 however remain electrically deenergized or closed) and the brake pedal actuation leads to a volume displacement out of the master brake cylinder 2 into the connected simulation device 3 (indicated by an arrow in FIG. 3). From the signals of the piston rod travel imparted in the process (for example by means of travel sensor 25) and of the master brake cylinder pressure (for example by means of pressure sensor 20), a driver braking demand signal is derived and is provided to the virtual driver for arbitration (prioritization).

Since the cooperative operating concept leads, in a steady state, to pressure equilibrium in a front-wheel and a rear-wheel brake (8, 9; 10, 11), the concepts discussed below are preferably implemented for the wheel pressure modulation (slip control).

In order not to abandon the circuit isolation (open system), a pressure dissipation is not performed by means of the outlet valves 7a-7d of the first brake system 300.

A pressure stoppage (pressure maintenance) by closing the inlet valves 6a-6d of the first brake system 300 is however possible and is implemented.

In the example, the pressure provision in the second brake system 70 is, in the event of a slip controller intervention, performed on the basis of the setpoint pressure values for the wheel brakes 8, 10 (in the example, the front-wheel brakes) which are connected to the second brake system 70. Since the inlet valves 6a-6d of the primary brake system 300 have check valves 50a-50d, the wheel brake 8, 10 "guides" the other wheel brake 9, 11 of the brake circuit I or II (in the example, the diagonally opposite rear-wheel brake). That is to say, the pressure of the rear-wheel brake will not exceed that of the front-wheel brake.

The pressure limitation at the wheel brake 9, 11 (for example rear-wheel brake) is preferably realized by virtue of the second brake system 70 outputting a signal to the first brake system 300 to close the inlet valve 6b, 6d assigned to the respective wheel brake 9, 11 when a certain (predefined) pressure p_crit is attained in the associated wheel brake 8, 10 (front-wheel brake). The pressure value p_crit will preferably be selected such that it adapts to a (predefined) critical deceleration z_crit of the vehicle.

Alternatively or in addition, the pressure limitation at the wheel brake 9, 11 (for example rear-wheel brake) is preferably performed by virtue of the signal for closing the inlet valve 6b, 6d assigned to the respective wheel brake 9, 11 being output when a predefined vehicle deceleration is attained. By means of this method, the behavior of a mechanical load-dependent brake force limiter is replicated.

Alternatively or in addition, the pressure limitation at the wheel brake 9, 11 (for example rear-wheel brake) is preferably performed by virtue of the first brake system 300 deciding, on the basis of wheel rotational speed signals, when the pressure stoppage is to be implemented (dynamic EBV).

The cooperative operating concept is preferably implemented under the assumption that the failure of the first brake system 300 is of such a severity that said first brake system can continue to activate at least individual valves, in particular the one or more isolating valves 23a, 23b and the simulator valve 32, and can sense a superposed brake actuation by the human driver.

This applies to all faults of the first brake system 300 which lead to the first pressure provision device 5 losing the capability to build up pressure.

Furthermore, the cooperative operation is preferably also implemented if the first brake system 300 fails owing to a critical low pressure medium level in the first pressure medium reservoir 4.

In the case of a fault mode of the first brake system 300 other than those mentioned, it is preferably furthermore the case that the exclusive operating concept is implemented as an electrically controllable fall-back level, that is to say a braking demand is implemented exclusively by means of the second braking system, that is to say activation of the second pressure provision device with the isolating valves 220, 240 closed.

An aspect of the invention expands the range of use of the brake installation considerably, or makes it suitable for the first time for demands that are to be expected in the case of highly automated driving, by eliminating, or at least reducing the likelihood of occurrence of, disadvantages of the hydraulic architecture of the exemplary brake installation of FIG. 1 in conjunction with the exclusive operating concept. Here, no additional system components are required, that is to say an inexpensive system expansion is realized.

The method according to an aspect of the invention for a brake installation composed of a first brake system and a second brake system eliminates the following major disadvantages of the system behavior in the electrically controllable fall-back level, that is to say during the use of the second brake system, of known brake installations:

Pressure build-up basically only in the front-wheel brakes 8, 10 and resulting limitation to approximately 60% of the possible braking action.

Pressure build-up in only one front-wheel brake in the case of particular hydraulic leaks and, consequently, greatly restricted braking action and yaw disturbance of the vehicle during the braking operation.

Non-controllability of a superposed brake actuation by the human driver.

The invention claimed is:

1. A method for operating an electrohydraulic brake installation for a motor vehicle comprising:
at least one first, one second, one third and one fourth hydraulically actuatable wheel brake,
a first brake system comprising a master brake cylinder which is actuatable by a brake pedal and which is hydraulically connected by at least one electrically actuatable isolating valve to the four wheel brakes, and comprising a first electrically controllable pressure provision device which is hydraulically connected to the four wheel brakes via at least one electrically actuatable sequence valve, and
a second brake system comprising a second electrically controllable pressure provision device which is hydraulically connected to the first and the third wheel brake, and comprising in each case one isolating valve for the first and the third wheel brake, wherein the isolating valve is arranged in each case in a hydraulic connection between the first brake system and the corresponding wheel brake,
wherein
in predefined states, a brake pressure build-up is performed in the second and the fourth wheel brake by virtue of the second pressure provision device being activated with the isolating valves open.

2. An electrohydraulic brake installation for a motor vehicle, for highly automated driving, comprising:
- at least one first, one second, one third and one fourth hydraulically actuatable wheel brake,
- a first brake system comprising a master brake cylinder which is actuatable by a brake pedal and which is hydraulically connected by at least one electrically actuatable isolating valve to the four wheel brakes, comprising a first electronic open-loop and closed-loop control unit, and comprising a first electrically controllable pressure provision device which is hydraulically connected to the four wheel brakes via at least one electrically actuatable sequence valve, and
- a second brake system comprising a second electrically controllable pressure provision device which is hydraulically connected to the first and the third wheel brake, comprising a second electronic open-loop and closed-loop control unit, and comprising in each case one isolating valve for the first and the third wheel brake, wherein the isolating valve is arranged in each case in a hydraulic connection between the first brake system and the corresponding wheel brake,
- wherein,
- in predefined states, a brake pressure build-up in the second and the fourth wheel brake is performed by virtue of the second electronic open-loop and closed-loop control unit activating the second pressure provision device, and wherein the isolating valves are opened, and
- wherein a method as claimed in claim 1 is implemented in said brake installation.

3. The brake installation as claimed in claim 2, wherein the first and the third wheel brake are assigned to the wheels of a front axle of the motor vehicle and the second and the fourth wheel brakes are assigned to the wheels of a rear axle of the motor vehicle.

4. The brake installation as claimed in claim 3, wherein, for the brake pressure build-up in the second and the fourth wheel brake by the second pressure provision device, at least one of the valves of the first brake system is electrically switched by the first electronic open-loop and closed-loop control unit such that pressure medium is conveyed by the second pressure provision device via the isolating valves and the first brake system to the second and the fourth wheel brake.

5. The brake installation as claimed in claim 2, wherein, for the brake pressure build-up in the second and the fourth wheel brake by the second pressure provision device, at least one of the valves of the first brake system is, electrically switched by the first electronic open-loop and closed-loop control unit, such that pressure medium is conveyed by the second pressure provision device via the isolating valves and the first brake system to the second and the fourth wheel brake.

6. The method as claimed in claim 1, wherein one of the predefined states is present if a pressure build-up is not possible by the first pressure provision device.

7. The method as claimed in claim 6, wherein one of the predefined states is present if, in addition, the electrical actuation of the at least one isolating valve of the first brake system is possible.

8. The method as claimed in claim 6, wherein one of the predefined states is present if, in addition, the electrical actuation of an electrically actuatable simulator valve provided for the activation or deactivation of a simulation device is possible.

9. The method as claimed in claim 6, wherein one of the predefined states is present if, in addition, a detection of an actuation of the brake pedal by a sensor of the first brake system is possible.

10. The method as claimed in claim 1, wherein one of the predefined states is present if only an insufficient or unquantifiable pressure build-up is possible by the first pressure provision device.

11. The method as claimed in claim 1, wherein one of the predefined states is present if, in a first pressure medium reservoir which is assigned to the first brake system and which is at atmospheric pressure, a pressure medium level is present which is lower than a predefined pressure medium threshold value.

12. The method as claimed in claim 1, wherein the second brake system comprises at least one second pressure medium reservoir, which is at atmospheric pressure, and at least one dissipation valve which is closed when electrically deenergized, wherein the second pressure provision device is connected at the pressure side via the at least one dissipation valve to the second pressure medium reservoir, and in that a brake pressure dissipation in the second or the fourth wheel brake is realized by an opening of the at least one dissipation valve.

13. The method as claimed in claim 12, wherein the second pressure provision device is connected at a suction side via at least one intake valve, which is closed when electrically deenergized, to the at least one second pressure medium reservoir, and in that, for the brake pressure build-up in the second and the fourth wheel brake by the second pressure provision device, the at least one intake valve is opened.

14. The method as claimed in claim 1, wherein the first brake system comprises, for each of the four wheel brakes, an electrically actuatable inlet valve which is arranged between the first pressure provision device and the wheel brake, and, in the predefined states, brake pressure control is implemented, wherein a limitation of a wheel brake pressure at the second or the fourth wheel brake is realized by a closure of the inlet valve, assigned to the corresponding wheel brake, of the first brake system.

15. The method as claimed in claim 1 wherein, for the brake pressure build-up in the second and the fourth wheel brake by the second pressure provision device, at least one of the valves of the first brake system is actuated.

16. The method as claimed in claim 1, wherein, for the brake pressure build-up in the second and the fourth wheel brake by the second pressure provision device, the at least one isolating valve of the first brake system is closed.

17. The method as claimed in claim 1, wherein the first brake system comprises a simulation device which is hydraulically connected to the master brake cylinder, wherein the simulation device is assigned an electrically actuatable simulator valve by which the simulation device is connectable and disconnectable, and, in the event of an actuation of the brake pedal, the simulation device is connected by the simulator valve during the brake pressure build-up by the second pressure provision device.

18. The method as claimed in claim 1, wherein, for the brake pressure build-up in the second and fourth wheel brake, pressure medium is conveyed by the second pressure provision device via the isolating valves and the first brake system to the second and the fourth wheel brake.

19. The method as claimed in claim 18, wherein, for the brake pressure build-up in the second and the fourth wheel brake by the second pressure provision device, at least one of the valves of the first brake system is actuated.

20. An electrohydraulic brake installation for a motor vehicle, for highly automated driving, comprising:
- at least one first, one second, one third and one fourth hydraulically actuatable wheel brake,
- a first brake system comprising a master brake cylinder which is actuatable by a brake pedal and which is hydraulically connected by at least one electrically actuatable isolating valve to the four wheel brakes, comprising a first electronic open-loop and closed-loop control unit, and comprising a first electrically controllable pressure provision device which is hydraulically connected to the four wheel brakes via at least one electrically actuatable sequence valve, and
- a second brake system comprising a second electrically controllable pressure provision device which is hydraulically connected to the first and the third wheel brake, comprising a second electronic open-loop and closed-loop control unit, and comprising in each case one isolating valve for the first and the third wheel brake, wherein the isolating valve is arranged in each case in a hydraulic connection between the first brake system and the corresponding wheel brake,
- wherein, in predefined states, a brake pressure build-up in the second and the fourth wheel brake is performed by virtue of the second electronic open-loop and closed-loop control unit activating the second pressure provision device, and wherein the isolating valves are opened, and
- wherein a method as claimed in claim 18 is implemented in said brake installation.

* * * * *